United States Patent [19]

Stefaniu et al.

[11] Patent Number: 4,879,541
[45] Date of Patent: Nov. 7, 1989

[54] SUPERVISORY CONTROL SYSTEM

[75] Inventors: Marian Stefaniu, Willowdale, Canada; Paul Gran, Kfar Saba, Israel; Haim Feiner, deceased, late of Herzlia; Ilana Feiner, heiress, Tel Aviv, both of Israel

[73] Assignee: Motorola, Inc., Schaumburg, Ill.

[21] Appl. No.: 168,719

[22] Filed: Mar. 16, 1988

Related U.S. Application Data

[63] Continuation of Ser. No. 868,174, May 22, 1986, abandoned, which is a continuation of Ser. No. 478,825, Mar. 25, 1983, abandoned.

[30] Foreign Application Priority Data

Apr. 7, 1982 [GB] United Kingdom ................. 8210326

[51] Int. Cl.$^4$ ............................................... H04Q 9/00
[52] U.S. Cl. .......................... 340/825.070; 340/825.06
[58] Field of Search ...................... 340/825.06, 825.07, 340/825.08, 825.09, 825.54, 825.52, 825.22, 505, 506, 517, 518, 825.44; 455/32, 53, 54, 67, 11, 70, 3, 4, 5; 375/4; 364/138–143

[56] References Cited

U.S. PATENT DOCUMENTS

| | | | |
|---|---|---|---|
| 3,855,456 | 12/1974 | Summers et al. | 340/517 |
| 4,172,280 | 10/1979 | Spiesman | 364/143 |
| 4,228,424 | 10/1980 | Lenay et al. | 340/506 |
| 4,230,989 | 10/1980 | Buehle | 375/4 |
| 4,352,992 | 10/1982 | Buennagel et al. | 340/825.060 |
| 4,360,828 | 11/1982 | Briggs, Jr. et al. | 455/3 |
| 4,388,690 | 6/1983 | Lumsden | 340/825.070 |
| 4,399,502 | 8/1983 | MacDonald et al. | 340/825.060 |
| 4,413,341 | 11/1983 | Markhasin et al. | 340/825.070 |
| 4,451,826 | 5/1984 | Fasching | 340/825.070 |
| 4,477,809 | 10/1984 | Bose | 455/54 |
| 4,484,258 | 11/1984 | Miller et al. | 340/825.070 |
| 4,638,453 | 1/1987 | Gran et al. | 364/900 |

Primary Examiner—Donald J. Yusko
Assistant Examiner—Edwin C. Holloway, III
Attorney, Agent, or Firm—Thomas G. Berry; Steven G. Parmelee

[57] ABSTRACT

A processing unit is provided in the form of a status and control unit which co-operates with a central station via a communications link. The unit is controlled by a microprocessor which is programmed to operate in a functional configuration controlled by the settings of one or more parameters. These parameters may be changed by means of a message transmitted to the unit from the central station.

15 Claims, 4 Drawing Sheets

SUPERVISORY CONTROL SYSTEM

This is a continuation of application Ser. No. 868,174, filed May 22, 1986, abandoned, which is a continuation of Ser. No. 478,825, filed Mar. 25, 1983, abandoned.

TECHNICAL FIELD

This invention relates to a signal processing unit and particularly but not exclusively to a unit suitable for forming part of a supervisory control system in which a plurality of such units perform monitoring and control functions under the supervision of a central station which communicates with the units via a communications link which may be a radio or wire line link.

BACKGROUND ART

A known signal processing unit of the above type may be a status unit, a control unit or a combined status-and-control unit.

A status unit monitors the state of one or more input signals and when a change of state occurs at a status input a message to that effect is generated and sent to the central station, the message containing an address which identifies the transmitting unit.

A control unit provides one or more control outputs at which signals are provided for remote control functions. Activation of a control output may result in the closure of a relay contract and this activation is initiated by means of a message sent from the central station to the control unit.

A status-and-control unit combines the functions of the other two types of unit.

A problem with known signal processing units of the above type is their inability to adapt to changing environmental conditions. For example, transmission may become unreliable due to transmission path deterioration.

This invention seeks to provide a signal processing unit which is more adaptable than known units and in which the above-mentioned problem is at least mitigated.

BRIEF DESCRIPTION OF THE INVENTION

According to this invention there is provided a signal processing unit comprising communication means for receiving messages transmitted to the processing unit; processing means for controlling operation of the unit in accordance with at least one stored operating parameter; storage means for storing the at least one parameter governing operation of the processing means and wherein the processing means is responsive to a received message to change the at least one parameter whereby the operating characteristics of the signal processing unit may be changed.

The processing means may be a microprocessor operating under programme control in accordance with the at least one stored parameter.

The storage means may be a random access memory cooperable with the processing means.

Further storage means cooperable with the processing means and the said storage means may be provided for storing an initial value of the at least one parameter.

The further storage means may be one or more digital switches.

The communication means may comprise transceiving means which may be a radio transceiver or a wire line link.

The signal processing unit may include status sensing means for sensing the status of one or more status inputs.

The signal processing unit may include one or more control outputs for providing remote control functions.

A plurality of signal processing units may be provided each communicating with a central station via the communication means.

BRIEF DESCRIPTION OF THE DRAWINGS

An exemplary embodiment of the invention will now be described with reference to the drawings in which.

DETAILED DESCRIPTION

Figure 1:
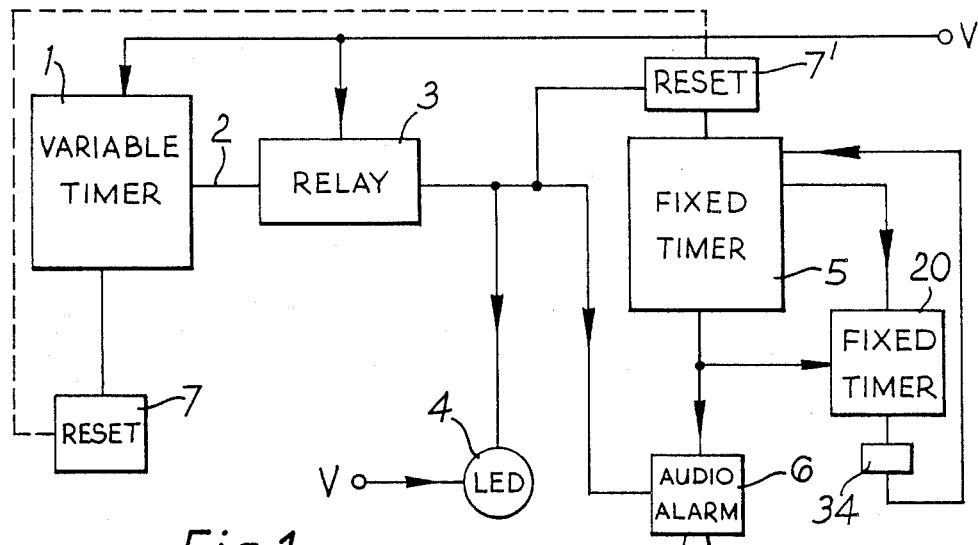
FIG. 1 illustrates schematically a supervisory control system including processing units in accordance with the present invention.

Referring now to FIG. 1 the supervisory control system illustrated comprises a central station 1 which supervises the activities of remotely located status and control units 2, 3 and 4. The central station communicates with the unit 2, 3 and 4 by means of radio transmission from an aerial 5 which transmissions are received by the respective aerials 6, 7 and 8 of the units 2, 3 and 4.

The status and control unit 2 has a number of status inputs 9 of which two are shown and a number of control outputs 10 of which two are illustrated. Likewise the unit 3 has status inputs 11 and control outputs 12 and the unit 4 status inputs 13 and control outputs 14. The status inputs 9 of the unit 2 provide monitoring functions such as the monitoring the water level at a reservoir and any change results in a change at the status inputs. This change may typically be a switch closure due to the water level change and may be communicated to the central station 1 by means of a transmission 15 in digitally coded form. The central station may then send a transmission to the status and control unit 2 in the reverse direction which contains a coded message instructing this unit to provide a control output at one of its outputs 10 to operate for example a pump.

In addition the status and control unit 2 may be configured so that a change in status at any one of its status inputs 9 results in a command message 16 to the status and control unit 3 to provide an output signal at one of its control outputs. Similarly unit 3 may correspond with the unit 4 via a transmission 17.

Figure 2:
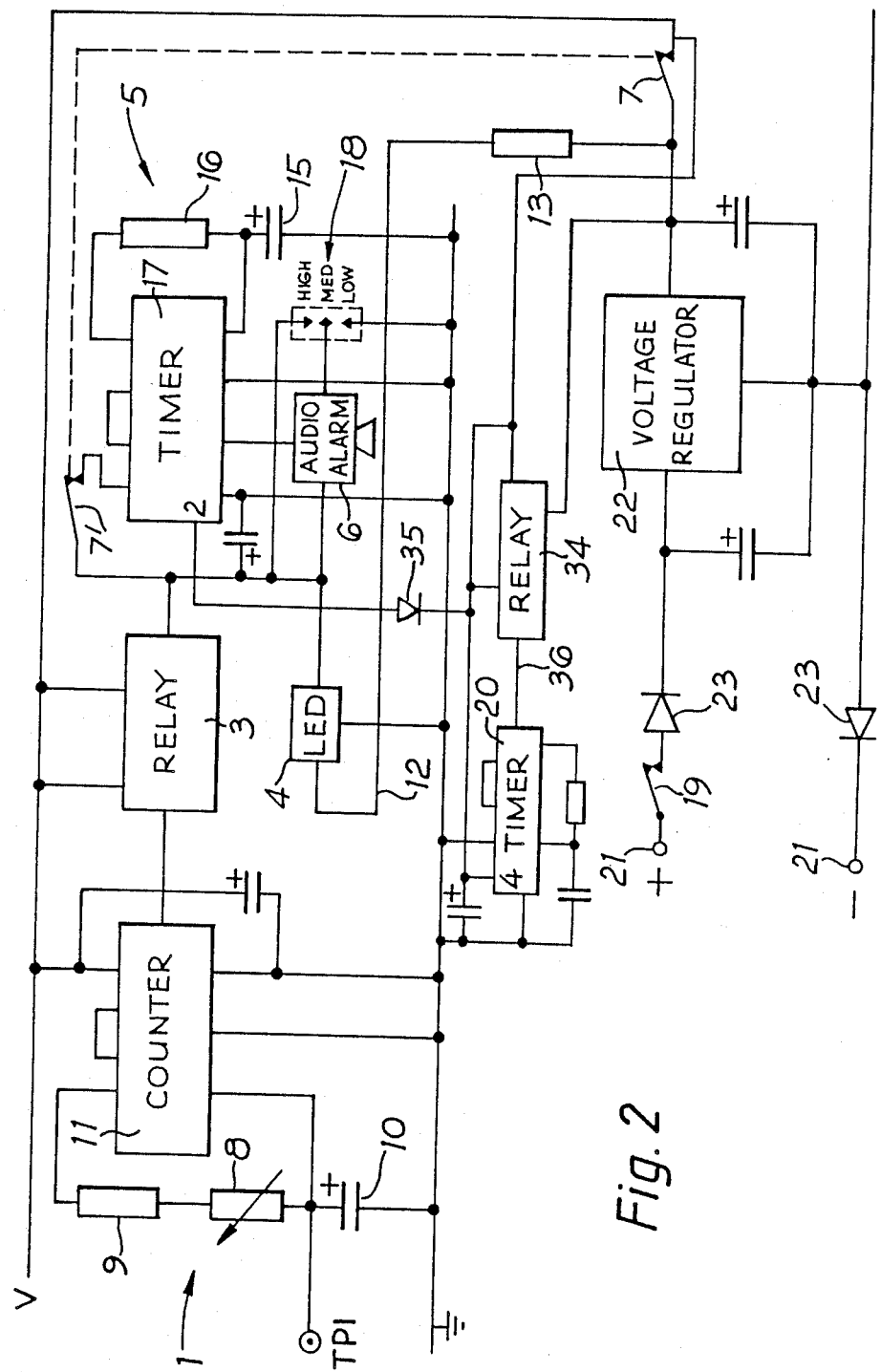
FIG. 2 illustrates the form of code word utilized for communication in the system of FIG. 1

A typical code word used for the digitally coded transmission is illustrated in FIG. 2 to which reference will now be made.

In FIG. 2 the illustrated code word contains 32 bits of information these bits being numbered from 0-31. Bit 0 in the present control system is always logical 1. Bits 1-11 define an address portion of the code word and identify a station for which a message is intended and a station from which a message originates. Bits 1-9 define the actual station address while bits 10 and 11 may be used to define a system address where more than one system of signal processing units is controlled by a single central station. Bits 12-25 effectively define the information content in the message, bits 12-14 signifying one group of a number of code word groups whilst bits 16-25 further define the function of the actual code word within the selection group. Bit 15 is always zero. Bits 26-30 constitute a Bose-Chaudhuri Cyclic code which is a function of all the preceeding bits and the final bit number 31 is a parity check bit for the entire code word.

Although the communication illustrated in FIG. 1 is by means of radio transmissions this communication may equally well be affected by a wire line link.

A signal processing unit in accordance with this invention and which may be used as the status and control units in the system of FIG. 1 will now be described with reference to FIG. 3

Figure 3:
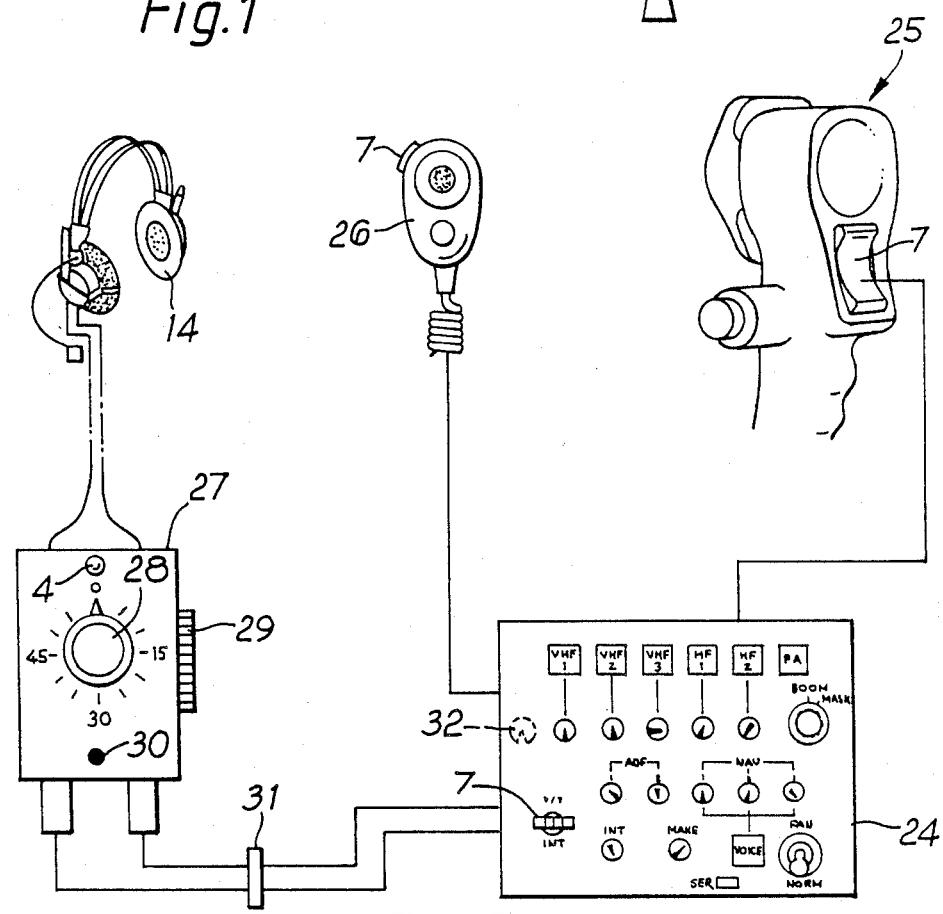
FIG. 3 illustrates a signal processing unit of this invention in more detail.

Referring now to FIG. 3 there is shown a more detailed schematic illustration of a signal processing unit in accordance with the invention. The unit includes a microprocessor 22 typically a Mostek 3870. The processing unit has a transceiver (not shown) which may be a radio or wire line unit and signals to and from this transceiver are coupled by means of a connector 23. Received signals are decoded by a F.S.K. decoder 24 and fed to an input 25 of the microprocessor 22. Similarly, signals intended for transmission from the unit are fed from the microprocessor 22 to the connector 23 via an F.S.K. encoder 26. The unit has a unique address which is set in an address store unit 27 which is read by the microprocessor from a data bus 28 to which the store 27 and the microprocessor 22 are coupled. The data bus 28 is also coupled via an input/output connector 29 to a status sensing unit 30 and a control output driver 31. The status sensing unit 30 typically formed by a number of gates, senses the status of a number of status inputs 32 whilst the control driver 31 provides control outputs to activate relays 33.

Status information sensed by the status sensing unit 30 is put onto the data bus 28 under the control of a command decoder 34 typically formed by a Motorola MC14556 which decodes commands fed from an output 35 of the microprocessor 22 via the input/output connector 29 and these commands are decoded under the control of a logic control decoder 36 which also receives signals from an output 40 of the microprocessor and which is also connected to the command decoder 34 via the input/output connector 29. The command decoder 34 is also coupled to the control driver 31 and therefore ensures that either status information or control signals for the control relays 33 is fed to the data bus 28.

Also coupled to the data bus 28 is a digital parameter store in the form of a number of DIP switches 37 and these switches are used to define a number of parameters which determine how the signal processing unit operates. The parameters are transferred via the data bus 28 under the control of the microprocessor 22 in an auxilliary RAM memory 38 which is accessed by the microprocessor via a connecting line 39.

The parameters can determine various operating modes. For example one parameter may determine whether the relays 33 are latching or momentary in operation. One parameter may determine whether the microprocessor generates a new message in response to the predetermined stimulus and another parameter may determine whether the new address for transmission is obtained by augmenting or decrementing the address of the unit concerned. Another parameter may determine the length of a transmission burst from the signal processing unit. The above are only a few typical examples of the controls which may be exercised by setting the parameter switches 37.

Assume that a coded message is sent to the illustrated signal processing unit to activate one of the relays 33. After decoding in the F.S.K. decoder 24 the message appears as a series of marks and spaces at the input 25 of the microprocessor 22. The microprocessor 22 reads the unit address from the address store 27 via the data bus 28 and if this address matches the address in the decoded message the microprocessor will act on the information contained in the message. A command will be transferred to the command decoder 34 from the output 35 of the microprocessor via input/output connector 29, and this command will be decoded by the command decoder 34 under the control of the logical control decoder 36 and will result in the connection of the control driver 31 to the data bus 28 and the subsequent operation of one of the relays 33.

As explained above the parameters which are set into the parameter switches 37 condition the manner in which the programme which is set into the microprocessor controls the operation of the signal processing unit. For example, one parameter may determine whether the control relays operate in a latching or a momentary mode. In momentary operation the relays reset automatically after one second.

In U.S. Pat. No. 4,638,453, there is described the manner in which a signal processing unit derives a message having a new address which consists of its own address modified in a predetermined manner. One parameter may be set to determine whether such generation of a new message to another signal processing unit ocurs at all and if it does whether the address is augmented or decremented.

A parameter may operate to cause the signal processing unit to perform control operations, either in a check forward mode in which two identical consecutive control words must be decoded to effect control or without the check forward mode in which decoding a single control word is sufficient to effect control. Another parmeter may determine whether the length of a radio transmission from the unit is in bursts of for example, 0.55 seconds or 2.00 seconds and containing approximately 8 or 20 words respectively. This allows the signal processing unit to respond to adverse transmission conditions.

Another parameter may determine whether the unit ignores selected status inputs preventing a change of state in those inputs from initiating transmissions or control functions. These are just some examples of operating parameters which may be set as digital values by the parameter switches 37.

Rather than being set once and for all by means of the switches 37 the contents of these switches are read onto the data bus 28 by the microprocessor 22 and into the auxilliary RAM memory 38 which thereafter is accessed via the connecting line 39 by the microprocessor 22. Once the contents of the parameter switches 37 are entered into the RAM memory 38 operation of the signal processing unit is thereafter controlled by the contents of this RAM memory and not by the settings of the parameter switches.

Operation of the unit can now be made more flexible by reconfiguring these parameters by means of a transmitted message. A code word message may be received by the signal processing unit from a central station in the usual manner and after decoding by the F.S.K. decoder 24 is fed to the microprocessor 22. The information in the coded message may be such as to enter new parameters into the auxiliary RAM memory 38 so as to reconfigure the functional capabilities of the signal processing unit. For example the ability of the unit to generate a new message to another unit having a different address may be overriden or the length of a transmission burst may be modified during adverse broadcasting conditions.

The values entered originally into the parameter switches 37 remain unaltered and during a start-up or default condition these values would once again be read by the microprocessor into the auxilliary RAM memory as a basic functional starting point for the unit.

Figure 4:
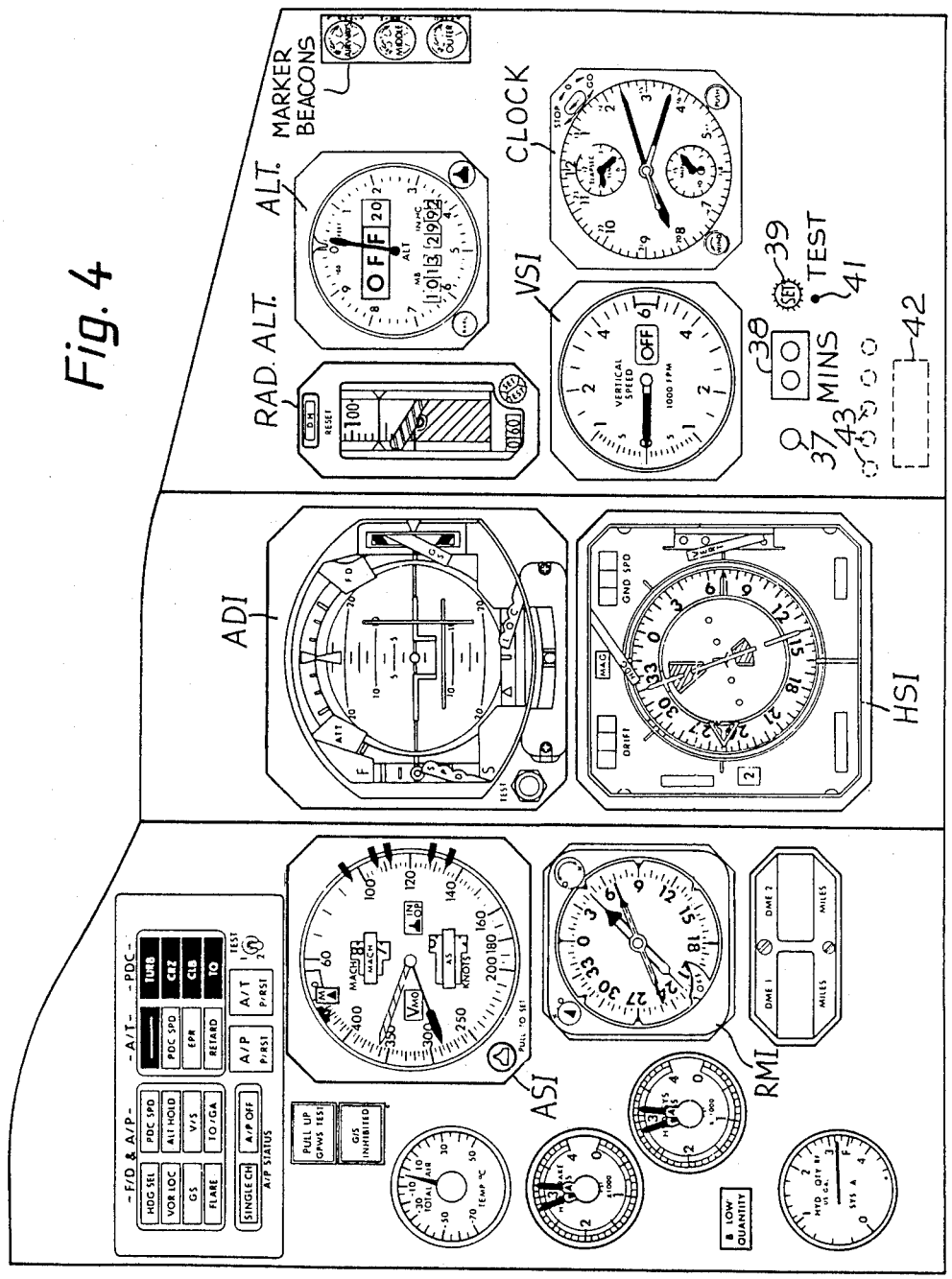
FIG. 4 is an explanatory flow chart diagram.
Figure 1:
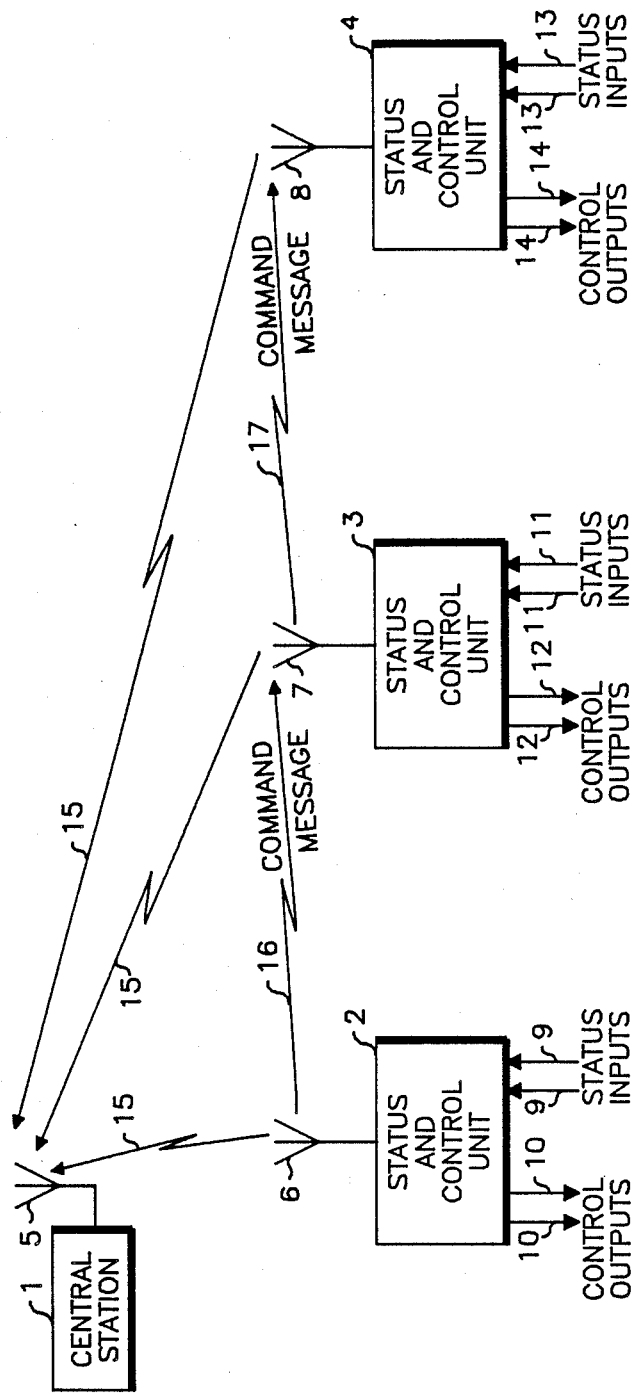

Referring now to FIG. 4 together with FIG. 3, there is shown a typical flow chart diagram illustrating the programming of the microprocessor 22 to perform the present invention. The routine is called when a decoded message indicates alternation of one or more parameters.

As currently envisaged the parameters, initially set by means of the digital switches 37, are arranged in a number of groups. Each parameter consists of one or more bits and a group contains eight bits. In this routine an entire group is changed at one time (although the change may only effect one bit). Any parameter defined as more than one bit must reside entirely within one group to prevent a communication fault producing a partially altered parameter.

Step A - Determine which parameter group requires alteration.

Step B - Replace the old group with the new decoded group.

Step C - Send an acknowledgement to the central station indicating which group of parameters has been altered.

The invention has been described by way of example only and modification may be made without departing from the scope of the invention. For example, the invention is not limited to the specific embodiments given by may be applied to any signal processing unit whose functional operation may be configured in accordance with one or more operating parameter.

We claim:

1. A method for dynamically altering the operational characteristics of a supervisory control system having at least one central station for communicating with a plurality of signal processing units each having a unit address and operational parameters stored therein, each of the plurality of signal processing units being operable to repeat a message from the central to another signal processing unit, comprising the steps of:
    (a) receiving a message including at least a unit address and a command signal from the central station;
    (b) modifying at least one parameter in response to said command signal;
    (c) operating, thereafter, upon each received message to generate a second message addressed to another of the plurality of signal processing units, and optionally operating upon said received message to perform a function designated therein, until said modified parameter is restored.

2. The method of claim 1, wherein the step of generating said second message comprises the steps of:
    (a) modifying said unit address to form a destination address;
    (b) appending said second message to said destination address.

3. The method of claim 2, whereien said modifying said unit address comprises incrementing said unit address by one.

4. The method of claim 2, wherein said modifying said unit address comprises decrementing said unit address by one.

5. A method for dynamically altering the operational characteristics of a supervisory control system having at least one central station for communicating with a plurality of signal processing units each having a unit address and operational parameters stored therein, each of the plurality of signal processing units being operable to repeat a message from the central to another signal processing unit, comprising the steps of:
    (a) receiving a message including at least a unit address and a command signal from the central station;
    (b) modifying at least one parameter in response to said command signal;
    (c) operating, thereafter, upon each received message to generate a second message to another of the plurality of signal processing units by incrementing said unit address by one and transmitting at least said second message preambled by said modified unit address, and optionally, operating upon said received message to perform a function designated therein, until said modified parameter is restored.

6. A method for dynamically altering the operational characteristics of a supervisory control system having at least one central station for communicating with a plurality of signal processing units each having a unit address and operational parameters stored therein, each of the plurality of signal processing units being operable to repeat a message from the central to another signal processing unit, comprising the steps of:
    (a) receiving a message including at least a unit address and a command signal from the central station;
    (b) modifying at least one parameter in response to said command signal;
    (c) operating, thereafter, upon each received message to generate a second message addressed to another of the plurality of signal processing units by decrementing said unit address by one and transmitting at least said second message preambled by said modified unit address, and optionally, operating upon said received message to perform a function designated therein, until said modified parameter is restored.

7. A supervisory control system having at least one central station for communicating with a plurality of signal processing units each having a unit address and operational parameters stored therein, each of the plurality of signal processing units being operable in a first mode to communicate solely with the central station and operable in a second mode to repeat a message from the central to another signal processing unit, said signal processing unit comprising:
    means for receiving a message including at least a unit address and a command signal from the central station;
    means for modifying at least one parameter in response to said command signal;
    means for operating, thereafter, upon each received message to generate a second message addressed to another of the plurality of signal processing units by incrementing said unit address by one and transmitting at least said second message preambled by said modified unit address, and means for operating upon said received message to perform a function designated therein, until said modified parameter is restored;

whereby, the signal processing unit operates in a first mode to communicate solely with central station, and operates in a second mode to transmit commands to other signal processing units.

8. A supervisory control system having at least one central station for communicating with a plurality of signal processing units each having a unit address and operational parameters stored therein, each of the plurality of signal processing units being operable in a first mode to communicate solely with the central station and operable in a second mode to repeat a message from the central to another signal processing unit, said signal processing unit comprising:

means for receiving a message including at least a unit address and a command signal from the central station;

means for modifying at least one parameter in response to said command signal;

means for operating, thereafter, upon each received message to generate a second message addressed to another of the plurality of signal processing units by decrementing said unit address by one and transmitting at least said second message preambled by said modified unit address, and means for operating upon asid received message to perform a function designated therein, until said modified parameter is restored;

whereby, the signal processing unit operates in a first mode to communicate solely with central station, and operates in a second mode to transmit commands to other signal processing units.

9. A method for dynamically altering the operational characteristics of a supervisory control system having at least one central station for communicating with a plurality of signal processing units each having a unit address and operational parameters stored therein, comprising the steps of:

(a) receiving a message including at least a unit address and a command signal from the central station;

(b) modifying at least one parameter in response to said command signal;

(c) operating, thereafter, only upon the condition that the subsequent messages are each consecutively received for a predetermined number of times until said modified parameter is restored.

10. The method of claim 9 wherein said operating step comprises operating only upon the condition that subsequent messages are each consecutively received twice.

11. A method for dynamically altering the operational characteristics of a supervisory control system having at least one central station for communicating with a plurality of signal processing units each having a unit address and operational parameters stored therein, comprising the steps of:

(a) receiving a message including at least a unit address and a command signal from the central station;

(b) modifying at least one parameter in response to said command signal;

(c) operating thereafter, only upon the condition that subsequent messages are each consecutively received, twice, until said modified parameter is restored.

12. A supervisory control system having at least one central station for communicating with a plurality of signal processing units each having a unit address and operational parameters stored therein, the system operable in a first mode to singly transceive each message and operate in a second mode to transceive each message for a predetermined number of times, said signal processing unit comprising:

means for receiving a message including at least a unit address and a command signal from the central station;

means for modifying at least one parameter in response to said command signal;

means for operating, thereafter, only upon the condition that subsequent messages are each consecutively received, twice, until said modified parameter is restored;

whereby, the system operates in a first mode to singly transceive each message, and operates in a second mode to transceive each message twice.

13. A method for dynamically altering the operational characteristics of a supervisory control system having at least one central station for communicating with a plurality of signal processing units each having a unit address and operational parameters stored therein, comprising the steps of:

(a) receiving a message including at least a unit address and a command signal from the central station;

(b) modifying at least one parameter in response to said command signal;

(c) transmitting, thereafter, extended data bursts until said modified parameter is stored.

14. The method of claim 13 wherein said transmitting step comprises the step of transmitting in two second bursts until said modified parameter is restored.

15. A supervisory control system having at least one central station for communicating with a plurality of signal processing units each having a unit address and operational parameters stored therein, a system operable in a first mode to transmit for a first duration and operable in a second mode to transmit for a second duration, the signal processing unit comprising:

means for receiving a message including at least one unit address and a command signal from the central station;

means for modifying at least one parameter in response to said command signal;

means for transmitting, thereafter, for an extended duration until said modified parameter is restored;

whereby, the system operates in a first mode to transmit for a first duration, and operates in a second mode to transmit for a second duration.

* * * * *

UNITED STATES PATENT AND TRADEMARK OFFICE
CERTIFICATE OF CORRECTION

PATENT NO. : 4,879,541

DATED : November 7, 1989

INVENTOR(S) : Marian Stefaniu, et al.

It is certified that error appears in the above-identified patent and that said Letters Patent is hereby corrected as shown below:

Col. 6, line 1, "whereien" should be --wherein--.

Col. 7, line 30, "asid" should be --said--.

Signed and Sealed this

Twenty-third Day of October, 1990

Attest:

HARRY F. MANBECK, JR.

*Attesting Officer*      *Commissioner of Patents and Trademarks*